US011435467B2

(12) United States Patent
Jadidian et al.

(10) Patent No.: US 11,435,467 B2
(45) Date of Patent: Sep. 6, 2022

(54) POWER-SPLITTER-BASED VIRTUAL ARRAY

(71) Applicant: Apple Inc., Cupertino, CA (US)

(72) Inventors: Jouya Jadidian, Saratoga, CA (US); Mohammad B. Vahid Far, San Jose, CA (US); Chunshu Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 453 days.

(21) Appl. No.: 16/583,564

(22) Filed: Sep. 26, 2019

(65) Prior Publication Data

US 2021/0096233 A1 Apr. 1, 2021

(51) Int. Cl.
*G01S 13/22* (2006.01)
*G01S 7/28* (2006.01)
*H04B 7/0413* (2017.01)

(52) U.S. Cl.
CPC .......... *G01S 13/225* (2013.01); *G01S 7/2806* (2013.01); *H04B 7/0413* (2013.01)

(58) Field of Classification Search
CPC .. H04B 7/0426; H04B 7/0413; H04B 7/0667; H04B 7/0671; G01S 13/225; G01S 7/2806; G01S 7/032
See application file for complete search history.

(56) References Cited

U.S. PATENT DOCUMENTS

| | | | | |
|---|---|---|---|---|
| 4,257,108 A * | 3/1981 | Igel | ........................ | H03K 3/64 |
| | | | | 327/295 |
| 6,195,035 B1 * | 2/2001 | Wood | ....................... | H01Q 1/38 |
| | | | | 342/149 |
| 6,658,269 B1 * | 12/2003 | Golemon | .............. | H04W 52/42 |
| | | | | 375/267 |
| 8,032,091 B2 | 10/2011 | Harel | | |
| 8,301,087 B2 * | 10/2012 | Gianola | ............... | H04B 7/0682 |
| | | | | 342/361 |
| 9,154,167 B1 * | 10/2015 | Lee | .......................... | H04B 1/28 |
| 9,344,176 B2 * | 5/2016 | Barker | ................. | H04B 7/0408 |
| 9,680,553 B1 * | 6/2017 | Tiebout | .................... | H04B 7/04 |
| 10,446,938 B1 * | 10/2019 | Wang | ....................... | G01S 7/352 |
| 10,749,566 B2 * | 8/2020 | Burke | .................. | H03H 11/344 |
| 2007/0093274 A1 * | 4/2007 | Jafarkhani | ........... | H04B 7/0626 |
| | | | | 455/562.1 |

(Continued)

*Primary Examiner* — Peter M Bythrow
(74) *Attorney, Agent, or Firm* — Kowert, Hood, Munyon, Rankin & Goetzel, P.C.

(57) ABSTRACT

During operation, a transmitter in an electronic device may provide, to a transmission path, an electrical signal. This electrical signal may be divided by the power splitter into a first output electrical signal in a first output transmission path and a second output electrical signal in a second output transmission path, which may result in transmitting of the first wireless signal and the second wireless signal by antennas. Because the second output transmission path may include a delay element that provides a delay, the second wireless signal may be delayed relative to the first wireless signal. Moreover, N radar receivers in the electronic device may receive first wireless-return signals corresponding to the first wireless signal and second wireless-return signals corresponding to the second wireless signal. These wireless-return signals may be combined to create a virtual array MIMO radar having an antenna aperture size of 2N.

20 Claims, 14 Drawing Sheets

(56) References Cited

U.S. PATENT DOCUMENTS

| | | | |
|---|---|---|---|
| 2010/0277371 A1* | 11/2010 | Markus | G01S 7/032 |
| | | | 342/375 |
| 2013/0072247 A1* | 3/2013 | Park | H04L 5/0057 |
| | | | 455/513 |
| 2014/0203969 A1* | 7/2014 | Maltsev | H04B 7/0617 |
| | | | 342/385 |
| 2014/0357319 A1* | 12/2014 | Maltsev | G01S 3/38 |
| | | | 455/562.1 |
| 2015/0200455 A1* | 7/2015 | Venkateswaran | H01Q 1/246 |
| | | | 342/372 |
| 2016/0156490 A1* | 6/2016 | Tarighat Mehrabani | H04W 16/28 |
| | | | 455/23 |
| 2017/0163328 A1* | 6/2017 | Tiebout | H04B 7/0408 |
| 2018/0088224 A1* | 3/2018 | Kishigami | H01Q 21/06 |
| 2018/0180713 A1* | 6/2018 | Cohen | G01S 13/32 |

* cited by examiner

POWER-SPLITTER-BASED VIRTUAL ARRAY

FIELD

The described embodiments relate, generally, to radar measurements by an electronic device, including techniques for performing radar measurements using an electronic device having a virtual array multi-input multi-output (MIMO) radar with shared transmitting channels via a power splitter.

BACKGROUND

Beamforming or spatial filtering is a signal processing technique that is used in some radar circuits for directional signal transmission and/or reception. For example, in a non-virtual array MIMO radar, a single transmitter may transmit wireless signals (such as pulses) having a carrier or a fundamental wavelength $\lambda$, and multiple receivers, separated by a distance of one half of the wavelength $\lambda/2$, may be used to receive wireless-return signals. As the number of receivers is increased, the beamforming resolution and the side lobe level are usually reduced. However, the cost of the multiple receivers can be prohibitive.

Alternatively, a virtual array MIMO radar may be used. In a virtual array MIMO radar, there may be two or more transmitters separated by a distance of an integer multiple of the wavelength and multiple receivers separated by a distance of one half of the wavelength. In general, the number of receivers may be reduced relative to the non-virtual array MIMO radar. Moreover, by transmitting wireless signals from the two or more transmitters and measuring the corresponding wireless-return signals using the multiple receivers, an effective aperture array may be created. This may provide a reduction in the beamforming resolution and the side lobe level, with reduced cost relative to the non-virtual array MIMO radar. However, depending on the implementation, a virtual array MIMO radar may have a lower frame rate, more transmission paths or circuitry, and/or a high-frequency radio-frequency (RF) switch, which may reduce the performance and/or increase the cost and the complexity of a virtual array MIMO radar.

SUMMARY

In a first group of embodiments, an electronic device that provides a first wireless signal and a second wireless signal is described. This electronic device may include a radar transmitter and a transmission circuit communicatively coupled to the radar transmitter. The transmission circuit may include a transmission path, which is divided by a power splitter into a first output transmission path and a second output transmission path. Moreover, the second output transmission path may include a delay element that provides a delay, and the first output transmission path may be communicatively coupled to a first antenna, and the second output transmission path may be communicatively coupled to a second antenna. During operation, the radar transmitter may provide, to the transmission path in the transmission circuit, an electrical signal. Then, after propagating in the transmission path, the power splitter may divide the electrical signal into a first output electrical signal in the first output transmission path and a second output electrical signal in the second output transmission path. Next, the first output electrical signal may propagate in the first output transmission path, and the first antenna may transmit the first wireless signal corresponding to the first output electrical signal. Furthermore, the second output electrical signal may propagate in the second output transmission path and the delay element, and the second antenna may transmit the second wireless signal corresponding to the second output electrical signal.

Note that the electrical signal may include or otherwise represent a pulse. Moreover, the second wireless signal may be delayed by the delay relative to the first wireless signal. Therefore, the first wireless signal may include a first pulse and the second wireless signal may include a second pulse.

Furthermore, the radar transmitter may provide one or more additional instances of the electrical signal to the transmission path in the transmission circuit. For example, the one or more additional instances of the electrical signal may be provided based at least in part on a time interval corresponding to a pulse repetition frequency (PRF). Additionally, the delay may correspond to one half of the PRF. Note that the delay may ensure that the second wireless signal is temporally separate or offset from (and, thus, orthogonal to) the first wireless signal.

In some embodiments, the electronic device includes N radar receivers, where N is a non-zero integer. Moreover, the electrical signal may have a fundamental wavelength and at least two adjacent radar receivers of the N radar receivers may be separated by one half of the fundamental wavelength. During operation, the N radar receivers may receive one or more first wireless-return signals corresponding to the first wireless signal and one or more second wireless-return signals corresponding to the second wireless signal. The electronic device may combine the one or more first wireless-return signals and the one or more second wireless-return signals to create a virtual array MIMO radar having an antenna aperture size of 2N.

Note that the first wireless signal and the second wireless signal may include or may represent radar or radar signals.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for providing a first wireless signal and a second wireless signal. The method includes at least some of the aforementioned operations performed by the electronic device.

In a second group of embodiments, an electronic device that provides first wireless signals and second wireless signals is described. This electronic device may include a first radar transmitter, a second radar transmitter, a switch selectively communicatively coupled to the first radar transmitter or the second radar transmitter, a transmission path communicatively coupled to the switch, and an antenna communicatively coupled to the transmission path. During operation, the first radar transmitter may provide a first set of electrical signals during a first time interval, where electrical signals in the first set of electrical signals may have a temporal separation corresponding to a PRF. After propagating through the switch and the transmission path, the antenna may transmit the first wireless signals corresponding to the first set of electrical signals during the first time interval. Then, the switch may selectively communicatively couple the second radar transmitter to the transmission path, and may selectively decouple the first radar transmitter from the transmission path. Next, the second radar transmitter may provide a second set of electrical signals during a second time interval, where electrical signals in the second set of electrical signals may have the temporal separation corresponding to the PRF. After propagating through the switch and the transmission path, the antenna may transmit the second wireless signals corresponding to the second set of electrical signals during the second time interval.

Note that the first set of electrical signals and the second set of electrical signals may include M pulses, where M is a non-zero integer.

Moreover, after transmitting the second wireless signals, the switch may selectively communicatively couple the first radar transmitter to the transmission path, and may selectively decouple the second radar transmitter from the transmission path.

Furthermore, a sum of the first time interval and the second time interval is a sub-frame, and the electronic device may repeatedly perform, in multiple sub-frames, the providing of the first set of electrical signals, the transmitting of the first wireless signals, the selective communicatively coupling and the decoupling, the providing of the second set of electrical signals, and the transmitting of the second wireless signals, and the selective communicatively coupling and the decoupling.

In some embodiments, the electronic device includes N radar receivers, where N is a non-zero integer. Furthermore, the first set of electrical signals and the second set of electrical signals may have a fundamental wavelength and adjacent radar receivers of the N radar receivers may be separated by one half of the fundamental wavelength. During operation, the N radar receivers may receive first wireless-return signals corresponding to the first wireless signals and second wireless-return signals corresponding to the second wireless signals. Then, the electronic device may combine the first wireless-return signals and the second wireless-return signals to create a virtual array MIMO radar having an antenna aperture size of 2N.

Note that the first wireless signals and the second wireless signals may include or may represent radar or radar signals.

Moreover, the first radar transmitter and the second radar transmitter may be spatially separated by an integer multiple of the fundamental wavelength.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for providing first wireless signals and second wireless signals. The method includes at least some of the aforementioned operations performed by the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
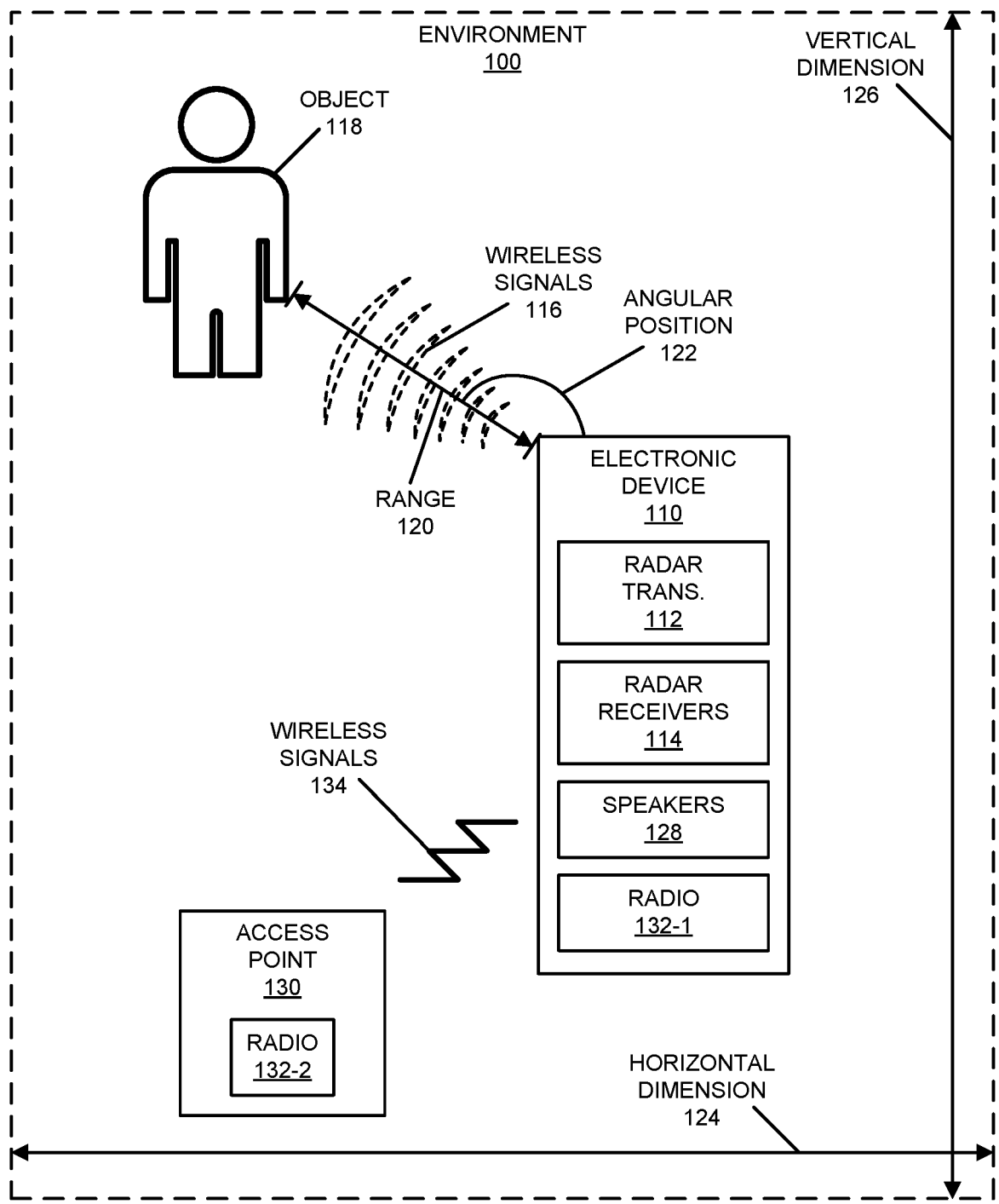
FIG. 1 is a block diagram illustrating an example of an electronic device performing radar measurements.

In a first group of embodiments, an electronic device that provides a first wireless signal and a second wireless signal is described. During operation, a transmitter in the electronic device may provide, to a transmission path, an electrical signal. This electrical signal may be divided by the power splitter into a first output electrical signal in a first output transmission path and a second output electrical signal in a second output transmission path, which may result in transmitting of the first wireless signal and the second wireless signal by antennas. Because the second output transmission path may include a delay element that provides a delay, the second wireless signal may be delayed relative to the first wireless signal. Moreover, N radar receivers in the electronic device (where N is a non-zero integer) may receive first wireless-return signals corresponding to the first wireless signal and second wireless-return signals corresponding to the second wireless signal. These wireless-return signals may be combined to create a virtual array MIMO radar having an antenna aperture size of 2N.

Note that the aforementioned operations may be repeated in different time intervals corresponding to a PRF, and the delay may correspond to one half of the PRF. This delay may ensure that the second wireless signal is temporally separate from (and, thus, orthogonal to) the first wireless signal.

By providing the first wireless signal and the second wireless signal, the measurement techniques may facilitate the virtual array MIMO radar using a single transmission path (and, thus, a smaller footprint or size), and without expensive complicated radio-frequency (RF) switching (and, thus, with reduced power consumption), complicated encoding of the first output electrical signal and the second output electrical signal, or synchronization of the first output electrical signal and the second output electrical signal. Therefore, this communication technique may reduce the cost and complexity of creating the virtual array MIMO radar. This capability may enable additional functionality and applications in the electronic device, which may improve the user experience. For example, this capability may allow the electronic device to continuously, or periodically, monitor an environment and/or an individual in the environment.

In a second group of embodiments, an electronic device that provides first wireless signals and second wireless signals is described. During operation, a first radar transmitter may provide, via a switch, a first set of electrical signals during a first time interval to a transmission path, which may result in transmitting of the first wireless signals by an antenna. Then, a second radar transmitter may provide, via the switch, a second set of electrical signals during a second time interval to the transmission path, which may result in transmitting of the second wireless signals by the antenna. Note that the electrical signals in a given set of electrical signals, which may be the first or the second set of electrical signals, may be pulses that have a temporal separation corresponding to a PRF. Moreover, N radar receivers in the electronic device (where N is a non-zero integer) may receive first wireless-return signals corresponding to the first set of wireless signals and second wireless-return signals corresponding to the second set of wireless signals. These wireless-return signals may be combined to create a virtual array MIMO radar having an antenna aperture size of 2N. The aforementioned operations may be repeated in different sub-frames corresponding to a sum of the first time interval and the second time interval.

By providing the first wireless signals and the second wireless signals, the measurement techniques may facilitate the virtual array MIMO radar with an improved signal-to-noise ratio and with a reduced RF switching frequency of the switch (and, thus, reduced power consumption). Therefore, this communication technique may reduce the cost and complexity of creating the virtual array MIMO radar. This capability may enable additional functionality and applications in the electronic device, which may improve the user experience. For example, this capability may allow the electronic device to continuously, or periodically, monitor an environment and/or an individual in the environment.

In the discussion that follows, the electronic device performs the radar measurements using radar signals in one or more bands of frequencies. For example, the radar signals may have one or more carrier or fundamental frequencies between 3.1-10.6 GHz (such as between 6-8 GHz). Notably, the wireless signals may be compatible include or may use UWB or 'pulse radio', and/or may be compatible with an IEEE 802.15 standard (such as IEEE 802.15.4). More generally, the wireless signals may have one or more carrier or fundamental frequencies between 300 MHz and 100 GHz and a bandwidth of at least 500 MHz or 20% of the carrier frequency.

For example, the radar signals may have fundamental frequencies between 2.5 GHz (which penetrate clothing and tissue) and 60 GHz (which is largely blocked or reflected by the human body). In some embodiments, the wireless signals included pulses. By using pulses with wide bandwidths (such as greater than or equal to 500 MHz), the uncertainty of the pulse timing (At) may be small enough to allow precise determination or estimate of range, such as a range resolution of less than a few centimeters (e.g., an accuracy on the order of a millimeter). In some embodiments, the range resolution may be between 100 $_1$.tm and 10 cm. In other embodiments, one or more other frequency ranges, bandwidths, protocols, and/or other wireless characteristics may be implemented.

Note that the measurement techniques may be used in conjunction with one or more other wireless ranging or location techniques in accordance with a communication protocol, such as a communication protocol that is compatible with an IEEE 802.11 standard (which is sometimes referred to as Wi-Fi). In some embodiments, the measurement techniques can be used with IEEE 802.11BA and/or IEEE 802.11ax. However, the measurement techniques may also be used with a wide variety of other communication protocols, and in electronic devices (such as portable electronic devices or mobile devices) that can incorporate multiple different radio access technologies (RATs) to provide connections through different wireless networks that offer different location-based services and/or capabilities.

Therefore, the electronic device can include hardware and software to support a wireless personal area network (WPAN) according to a WPAN communication protocol, such as those standardized by the Bluetooth Special Interest Group (in Kirkland, Washington) and/or those developed by Apple (in Cupertino, California) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes peer-to-peer communication techniques.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point.

Additionally, it should be understood that, in some embodiments, the electronic devices described herein may be configured as multi-mode wireless communication devices that are also capable of communicating via different 3G and/or second generation (2G) RATs. In these scenarios, a multimode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of an electronic device that performs radar measurements. Notably, electronic device 110 (such as a computer, e.g., a laptop, a notebook computer, or a tablet, a smartphone or a wearable device, e.g., a smartwatch, a wireless speaker; an IoT device, a smart appliance, a set-top box, a security device, or another type of electronic device) may include one or more radar transmitters 112 and N separate radar receivers (Rx) 114 that are co-located in electronic device 110. In some embodiments, the one or more radar transmitters 112 and the N radar receivers 114 may be arranged in a circular architecture that provides 360° coverage in a horizontal plane. In other embodiments, other shapes or arrangements can be used for the layout of the one or more radar transmitters 112 and radar receivers 114, such as a different ellipse, triangular, rectangular, multiple curves, other geometric shapes, etc. At a given time, at least a subset of the one or more radar transmitters 112 may transmit wireless signals 116 (such as radar signals) and at least a subset of the N radar receivers performs the radar measurements on the returned or the reflected radar signals (which are sometimes referred to as 'wireless-return signals'). Then, based at least in part on the radar measurements performed by at least a subset of the N radar receivers 114, electronic device 110 may determine a location of an object 118 (such as an individual, furniture, a wall or boundary, etc.) in an environment 100 (such as a room) that includes electronic device 110. Note that the location may include a range 120 or distance to object 118 and/or an angular position 122 of object 118.

Moreover, electronic device 110 may identify object 118 (such as the identity of an individual) based at least in part on one or more of the radar measurements. Identifying the individual can include determining a specific identity of the individual or determining an identifying attribute or characteristic of the individual. Additionally, based at least in part on the radar measurements, electronic device 110 may determine at least one of a vital sign of the individual and/or a medical condition of the individual. In some embodiments, electronic device 110 determines, based at least in part on the radar measurements, one or more dimensions of environment 100 (such as a horizontal dimension 124 or vertical dimension 126), an acoustic property of object 118 or environment 100 (such as absorption or a reverberation time), and/or an orientation of electronic device 110 in environment 100.

Note that the one or more radar transmitters 112 and the N radar receivers 114 (as well as one or more associated antennas) may have a static or a dynamic field of view (such as an angular range that is greater than 90° and less than) 180°. Thus, antennas in electronic device 110 may have fixed antenna patterns or may have a directional antenna pattern that is other than or different from an omnidirectional antenna pattern. In some embodiments, one or more radar transmitters 112 and the one or more antennas may provide 360° coverage around electronic device 110 at least in a horizontal plane.

In some embodiments, the transmitted wireless signals 116 include pulsed radar signals and/or continuous-wave radar signals. For example, the pulsed radar signals may offer low power consumption (with a range resolution of, e.g., 5 cm, less than 5 cm, 5-10 cm, etc.), and the continuous-wave radar signals may provide rich Doppler measurements (with a range resolution of, e.g., a fraction of a centimeter). Thus, the range resolution in the radar measurements may be, e.g., between 1-10 cm. Note that a duration of the pulsed radar signals may be, e.g., 1 ns, which may, at least in part, determine a near-field resolution of electronic device 110. However, wireless signals 116 may be delayed by electronic device 110, so that a near field of the one or more radar transmitters 112 is not determined by a pulse width or duration of wireless signals 116. In some embodiments, electronic device 110 may calibrate internal delays of electrical signals, and may use the delays to delay radio-frequency signals so that the near field is not determined by the pulse width or duration. Additionally, a maximum range of wireless signals 116 may be, e.g., 10-20 m, and a latency of wireless signals 116 may correspond to, e.g., a 25 ms/radar frame. Additionally, the carrier or fundamental frequency of wireless signals may be configurable.

While the following discussion illustrates the measurement techniques using pulses, in other embodiments (e.g., frequency-modulated) continuous-wave signals (such as chirp or pulse-compressed signals) may be used, and range 120 may be determined from amplitude modulation, frequency modulation and/or phase modulation of reflected signals. Moreover, operations in the measurement techniques may be performed in the time and/or frequency domain, and may be implemented using analog or digital techniques.

Figure 2:
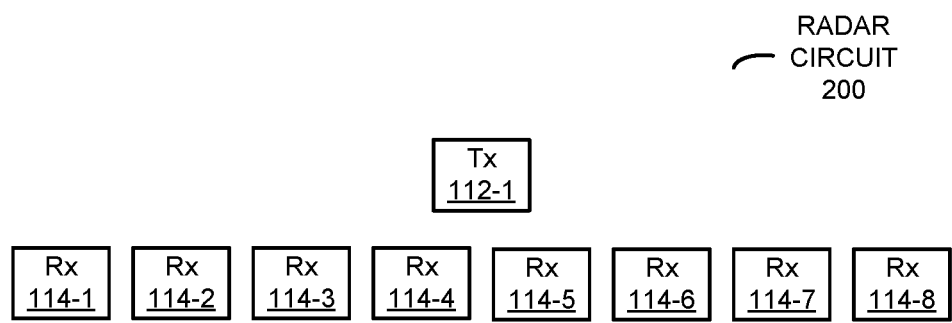
FIG. 2 is a block diagram illustrating an example of a radar circuit.

As discussed previously, beamforming (such as the use of phase or timing information) may be used to improve the resolution and side-lobe level of the radar measurements. Notably, as shown in FIG. 2, which presents a radar circuit 200, beamforming may be implemented using a non-virtual array MIMO radar. This non-virtual array MIMO radar may include a single radar transmitter 112-1 that transmits a wireless signal (such as a pulse) having a carrier or a fundamental wavelength X., and N radar receivers 114 (where N is a non-zero integer) that receive wireless-return signals, where adjacent radar receivers are separated by a distance of one half of the fundamental wavelength λ/2. These wireless-return signals may be combined to create an antenna aperture size of N. For example, nine physical channels (radar transmitter 112-1 and eight radar receivers 114) may be used to create an antenna aperture size of 8. However, the cost of the N radar receivers 114 can be prohibitive.

Figure 3:
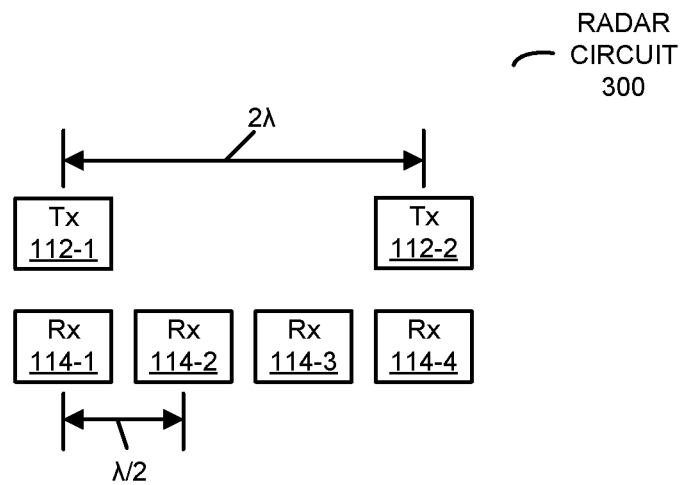
FIG. 3 is a block diagram illustrating an example of a radar circuit.
Figure 4:
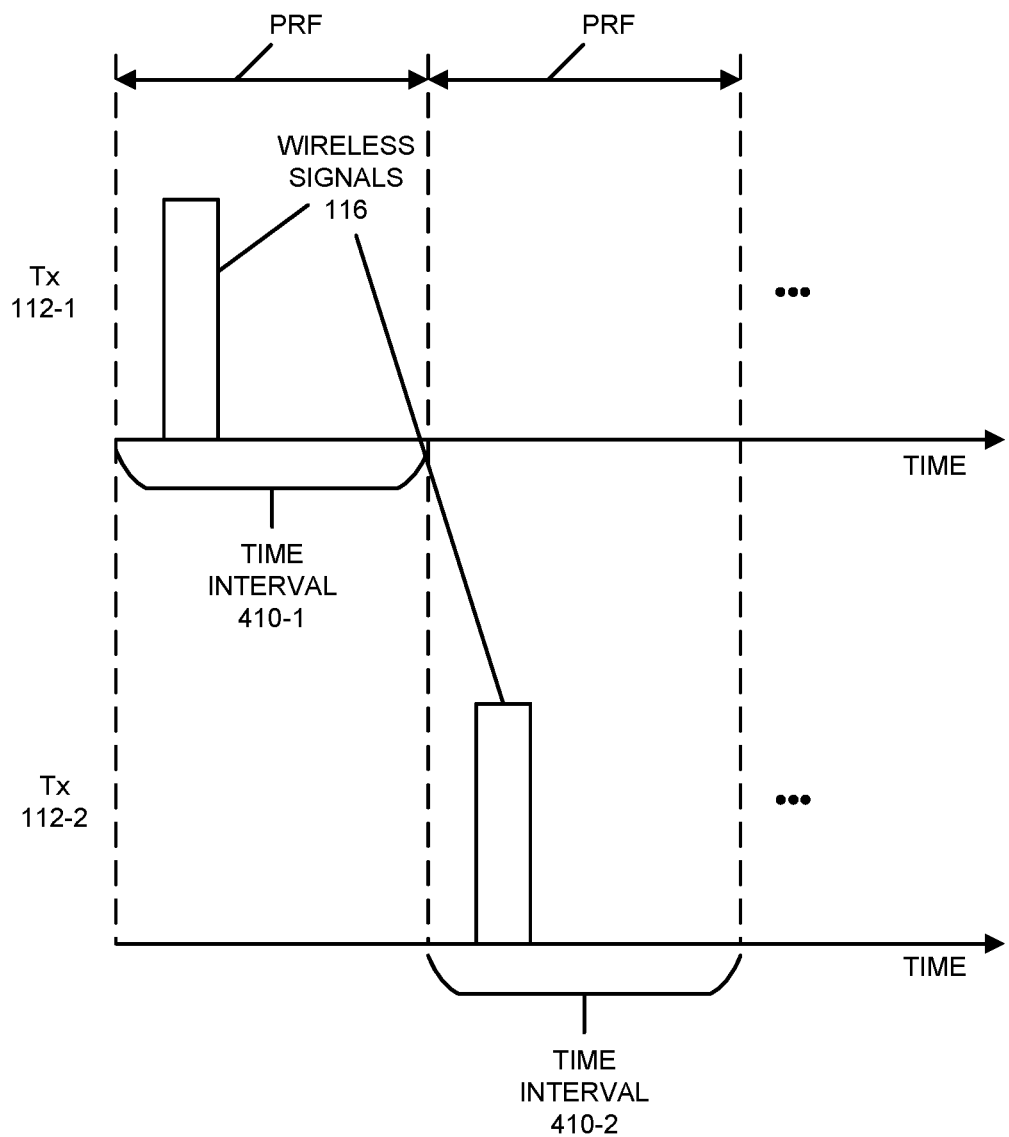
FIG. 4-6 shown drawings illustrating examples of operation of the radar circuit of FIG. 3.

In order to reduce the number of radar receivers 114, a virtual array MIMO radar may be used. This is shown in FIG. 3, which presents a radar circuit 300 with a virtual array MIMO radar. Notably, the virtual array MIMO radar may include two radar transmitters 112-1 and 112-2 separated by a distance of twice the fundamental wavelength, and four radar receivers 114 separated by a distance of one half of the fundamental wavelength. As shown in FIG. 4, which presents a technique for operating radar circuit 300, radar transmitters 112-1 and 112-2 may sequentially transmit wireless signals 116 (such as pulses) in different time intervals 410 (specified by or corresponding to a PRF) using time-division multiplexing. Then, the four radar receivers 114 may receive wireless-return signals. These wireless-return signals may be combined to create an antenna aperture size of 8. Thus, six physical channels (two radar transmitters 112 and six radar receivers 114) may be used to create this antenna aperture. However, in this approach, each of the transmit channels may have a separate transmission path or circuitry.

Figure 5:
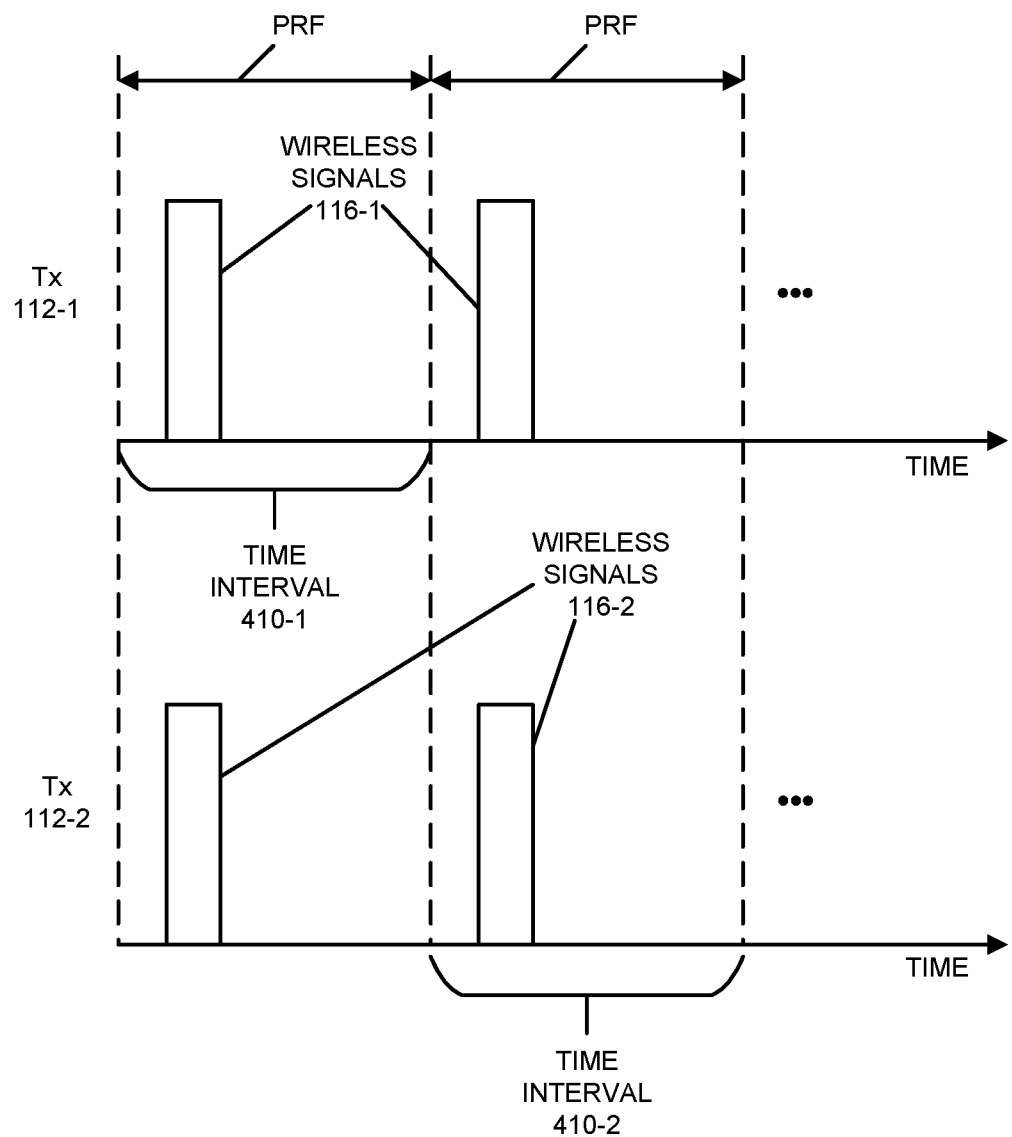

Alternatively, as shown in FIG. 5, which presents a technique for operating radar circuit 300, radar transmitters 112-1 and 112-2 may concurrently transmit different wireless signals 116 in the different time intervals 410 using code-division multiplexing and/or frequency-division multiplexing. For example, radar transmitter 112-1 may transmit pulses in time intervals 410, while radar transmitter 112-2 may transmit -1 times pulses in time intervals 410. Then, the four radar receivers 114 may receive wireless-return signals. These wireless-return signals may be combined to create an antenna aperture size of 8. For example, wireless signals 116 transmitted by radar transmitters 112-1 and 112-2 may be orthogonally coded (such as using a Hadamard code) and/or may have different carrier or fundamental frequencies, so that the different wireless-return signals can be distinguished. However, once again, in this approach, each of the transmit channels has a separate transmission path or circuitry.

Figure 6:
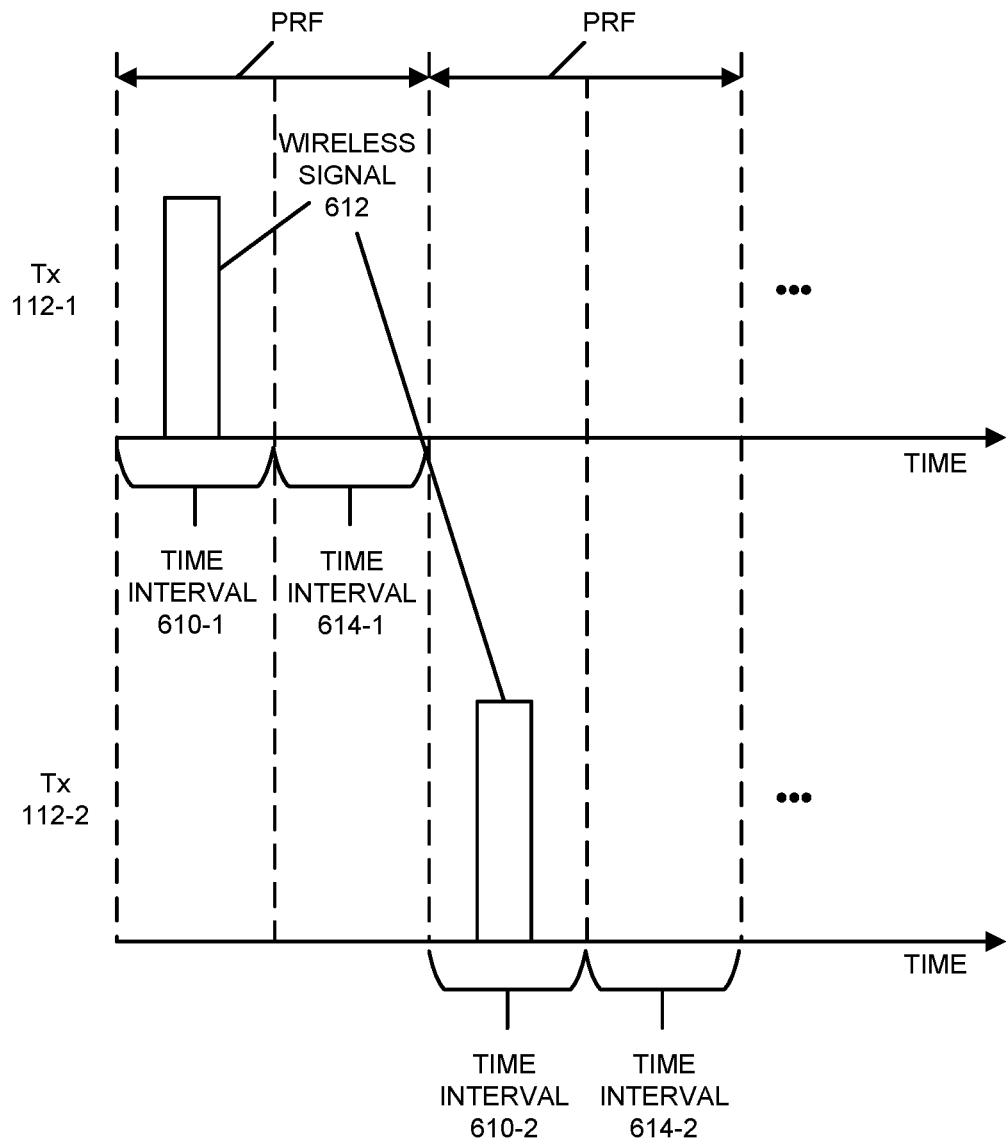

In some embodiments, the virtual array MIMO radar shown in FIG. 3 is implemented using a single transmission path that is shared by radar transmitters 112-1 and 112-2. Notably, as shown in FIG. 6, which presents a technique for operating radar circuit 300, in a time interval 610-1, radar transmitter 112-1 may transit a wireless signal 612 (such as a pulse) and then the transmission path may switch from radar transmitter 112-1 to radar transmitter 112-2 in time interval 614-1. Next, in time interval 610-2, radar transmitter 112-2 may transit wireless signal 612 and then the transmission path may switch from radar transmitter 112-2 to radar transmitter 112-1 in time interval 614-2. This alternating pattern may repeat in the subsequent time intervals 410. While this approach may reduce the number of transmission paths, the frame rate is reduced by a factor of two. In addition, it can be difficult to design an RF switch that operates at the PRF.

These challenges may be addressed using embodiments of the communication techniques. As described further below with reference to FIGS. 7-10, instead of using a switch to facilitate transmission of temporally offset wireless signals 116 (such as pulses) by different radar transmitters 112 using different transmission paths, a transmission circuit in electronic device 110 may include a transmission path, which is divided, by a power splitter into a first output transmission path that is communicatively coupled to a first antenna and a second output transmission path communicatively coupled to a second antenna. Moreover, the second output transmission path may include a delay element configured to provide a delay (such as a delay corresponding to one half of a PRF). Thus, the transmission circuit may allow electronic device 110 to passively transit temporally offset wireless signals 116 corresponding to the output electrical signals in the first output transmission path and the second output transmission path. The transmissions may be repeated in multiple time intervals corresponding to a PRF. Furthermore, N radar receivers 114 may receive wireless-return signals corresponding to wireless signals 116, and these wireless-return signals may be combined to a virtual array MIMO radar having an antenna aperture size of 2N.

Alternatively, as described further below with reference to FIGS. 11-14, different radar transmitters 112 may, using a switch, share a transmission path and an antenna. During a first time interval, radar transmitter 112-1 may transmit wireless signals 116 (such as multiple pulses separated by the PRF). Then, during a second time interval, radar transmitter 112-2 may transmit wireless signals 116 (such as multiple pulses separated by the PRF). At the end of a given time interval, the switch may selectively communicatively couple one of radar transmitters 112 to the transmission path and the antenna, and may selectively decouple the other of radar transmitters 112 from the transmission path and the antenna. The transmissions may be repeated in multiple first and second time intervals, which define or specify a subframe. Furthermore, N radar receivers 114 may receive wireless-return signals corresponding to wireless signals 116, and these wireless-return signals may be combined to a virtual array MIMO radar having an antenna aperture size of 2N.

In these ways, the embodiments of the measurement techniques may simplify the transmission of wireless signals 116 and, thus, the creation of the virtual array MIMO radar. For example, the embodiments of the measurement techniques may simplify the transmission path, may eliminate or simplify the switch (such as by reducing an RF switching frequency), and may reduce the cost of the transmission circuitry. Moreover, the embodiments of the measurement techniques may improve the performance of the radar measurements, such as by increasing the signal-to-noise ratio. Therefore, the embodiments of the measurement techniques may enable the use of radar measurements by electronic device 110, which may provide additional functionality and applications, including: monitoring of environment 100 that includes electronic device 110 (such as determining the location of object 118), health-related monitoring and applications (such as vital-sign monitoring or determining of a health condition), identification of one or more individuals in environment 100, and/or determining the dimension(s), acoustic property and/or orientation (which may allow sound, such as a sound field, output by speakers 128 in or associated with electronic device 110 to be tailored or customized to conditions in environment 100). These capabilities may improve the user experience when using electronic device 110.

Referring back to FIG. 1, in some embodiments electronic device 110 and access point 130 may communicate wirelessly in a WLAN using an IEEE 802.11 communication protocol. (Alternatively, electronic device 110 may communicate with a cellular-telephone network, which is not shown in FIG. 1.) Thus, electronic device 110 may be associated with access point 130. For example, electronic device 110 and access point 130 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 130 may provide access to a network, such as the Internet, via an Ethernet protocol, and may be a physical access point or a virtual or 'software' access point that is implemented on a computer or an electronic device.

Figure 15:
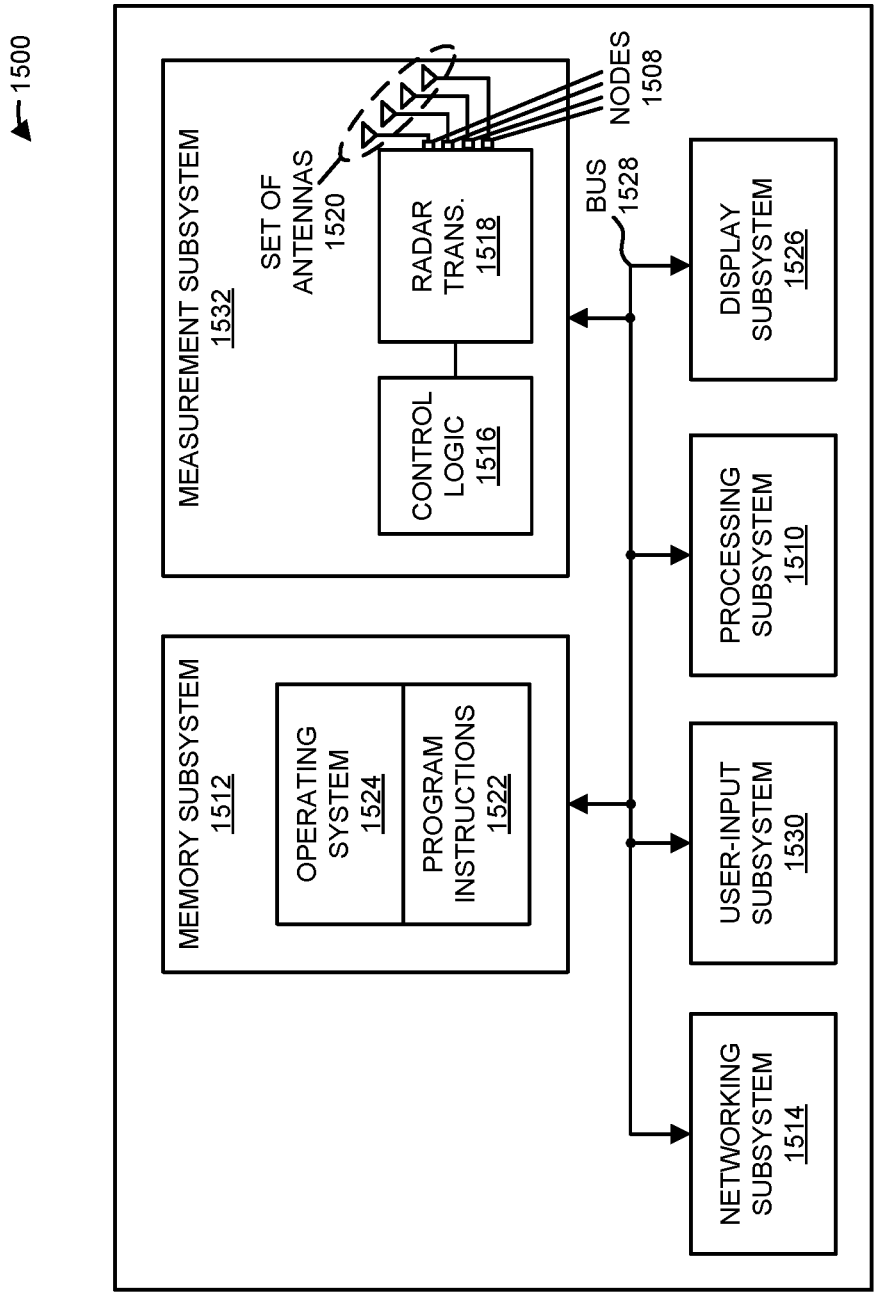
FIG. 15 is a block diagram illustrating an example of an electronic device.

As described further below with reference to FIG. 15, electronic device 110 and/or access point 130 may include subsystems, such as a networking subsystem, a memory subsystem, a processor subsystem and a measurement subsystem. In general, electronic device 110 may include any electronic device with a measurement subsystem that enables electronic device 110 to perform radar measurements. In addition, electronic device 110 and/or access point 130 may include radios 132 in the networking subsystems. In some embodiments, electronic device 110 and access point 130 can include (or can be included within) any electronic devices with networking subsystems that enable electronic device 110 and access point 130, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 134 (represented by a jagged line) are communicated by radios 132-1 and 132-2 in electronic device 110 and access point 130, respectively. For example, as noted previously, electronic device 110 and access point 130 may exchange packets using a Wi-Fi communication protocol in a WLAN. In some embodiments, radio 132-1 may receive wireless signals 134 that are transmitted by radio 132-2. Alternatively, radio 132-1 may transmit wireless signals 134 that are received by radio 132-2.

Note that access point 130 and electronic device 110 may be compatible with an IEEE 802.11 standard that includes trigger-based channel access (such as IEEE 802.11ax). However, access point 130 and electronic device 110 may also communicate with one or more legacy electronic devices that are not compatible with the IEEE 802.11 standard (e.g., that do not use multi-user trigger-based channel access). In some embodiments, electronic device 110 uses multi-user transmission (such as orthogonal frequency division multiple access or OFDMA). For example, radio 132-2 may provide a trigger frame for one or more electronic devices. Moreover, after radio 132-1 receives a trigger frame, radio 132-1 may provide a group acknowledgment to radio 132-2. For example, radio 132-1 may provide the acknowledgment during an assigned time slot and/or in an assigned channel in the group acknowledgment. However, in some embodiments the one or more electronic devices may individually provide acknowledgments to radio 132-2. Thus, after radio 132-1 receives the trigger frame, radios (such as radio 132-1) in the one or more electronic devices) may provide an acknowledgment to radio 132-2.

In the described embodiments, processing a packet or frame in electronic device 110 and access point 130 includes: receiving wireless signals 134 encoding a packet or a frame; decoding/extracting the packet or frame from received wireless signals 134 to acquire the packet or frame; and processing the packet or frame to determine information contained in the packet or frame (such as data in the payload).

In general, the communication via the WLAN in the measurement techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, different electronic devices may be transmitting and/or receiving radar signals.

We now further describe embodiments of the measurement techniques. As noted previously, in some embodiments a transmission circuit is used to passively provide a first wireless signal and a second wireless signal that is delayed relative to the first wireless signal.

Figure 7:
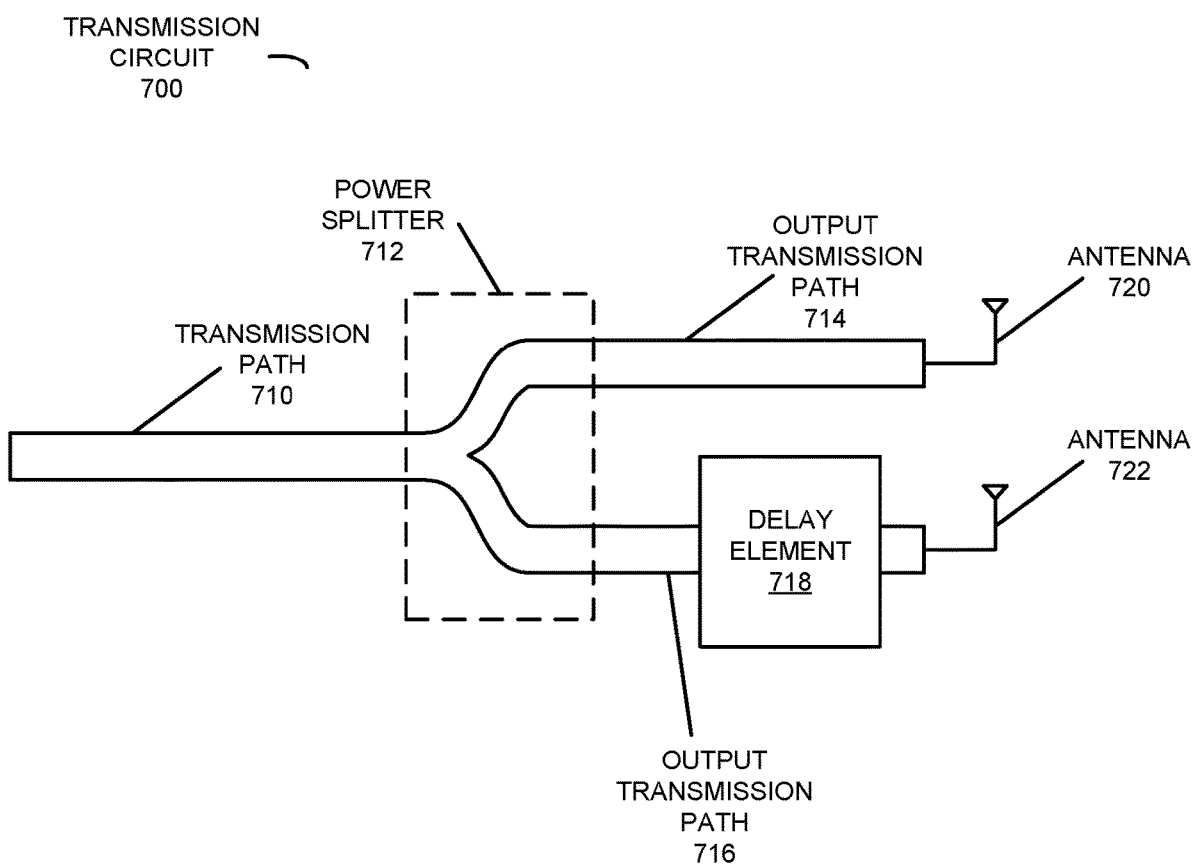
FIG. 7 is a block diagram illustrating an example of a transmission circuit in the electronic device of FIG. 1.

This is shown in FIG. 7, which presents a block diagram illustrating an example of a transmission circuit 700 in electronic device 110 (FIG. 1). Transmission circuit 700 may include a transmission path 710, which is divided, by a power splitter 712 into an output transmission path 714 and an output transmission path 716. Moreover, output transmission path 716 may include a delay element 718 that provides a delay. For example, as described further below the delay may correspond to one half of a PRF (such as a delay of PRF/2 or, e.g., 33.35 ns). Furthermore, output transmission path 714 may be communicatively coupled to an antenna 720, and output transmission path 716 may be communicatively coupled to antenna 722. Note that antennas 720 and 722 may be different instances of a antenna (such as a horizontal, a vertical or a circularly polarized antenna) or may be different antennas (e.g., antenna 720 may have a horizontal polarization and antenna 722 may have a vertical polarization.

Figure 8:
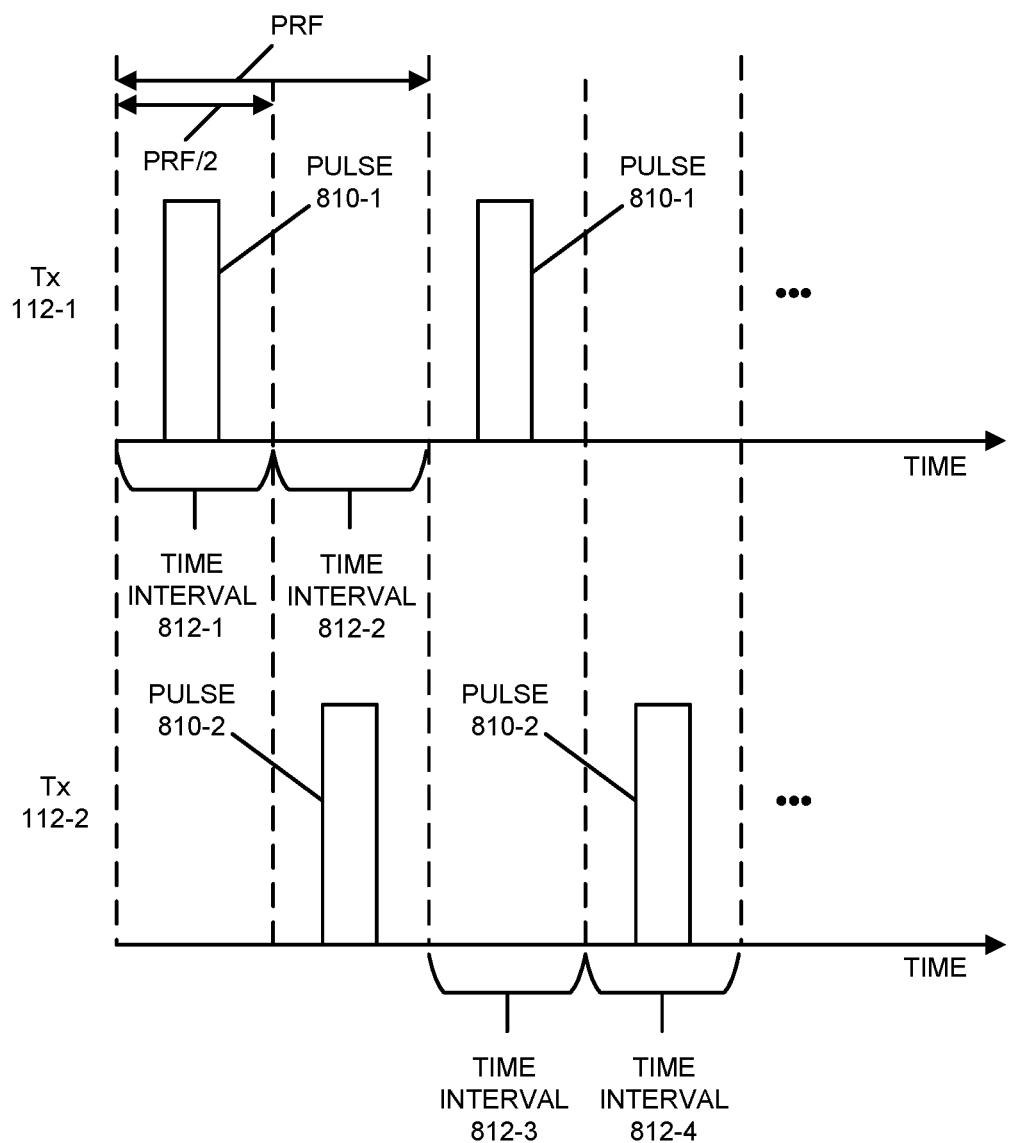
FIG. 8 is a drawing illustrating operation of the transmission circuit of FIG. 7.

FIG. 8 presents a drawing illustrating operation of transmission circuit 700 (FIG. 7). During operation of an electronic device (such as electronic device 110) that includes transmission circuit 700 in FIG. 7, a single radar transmitter 112-1 may provide an electrical signal (such as a pulse) having a carrier or a fundamental wavelength (e.g., 2.5 cm). After division by power splitter 712 and the delay provided by delay element 718, transmission circuit 700 may transmit a first wireless signal (such as pulse 810-1) in time interval 812-1 and a second (delayed, e.g., by PRF/2) wireless signal (such as pulse 810-2) in time interval 812-2. Then, N radar receivers 114 (FIG. 1) (where N is a non-zero integer) may receive wireless-return signals, where adjacent radar receivers are separated by a distance of one half of the fundamental wavelength λ/2 (e.g., 1.25 cm). These wireless-return signals may be combined to create an antenna aperture size of 2N. For example, five physical channels (one radar transmitter 112-1 and four radar receivers 114) may be used to create an antenna aperture size of 8. This approach may passively (i.e., without switching) provide the wireless signals used to create a virtual array MIMO radar using time-division multiplexing. Note that the frame rate in this approach may be reduced by a factor of two. In some embodiments, the transmitting of the first wireless signal and the second wireless signal is repeated in subsequent time intervals 812.

Figure 9:
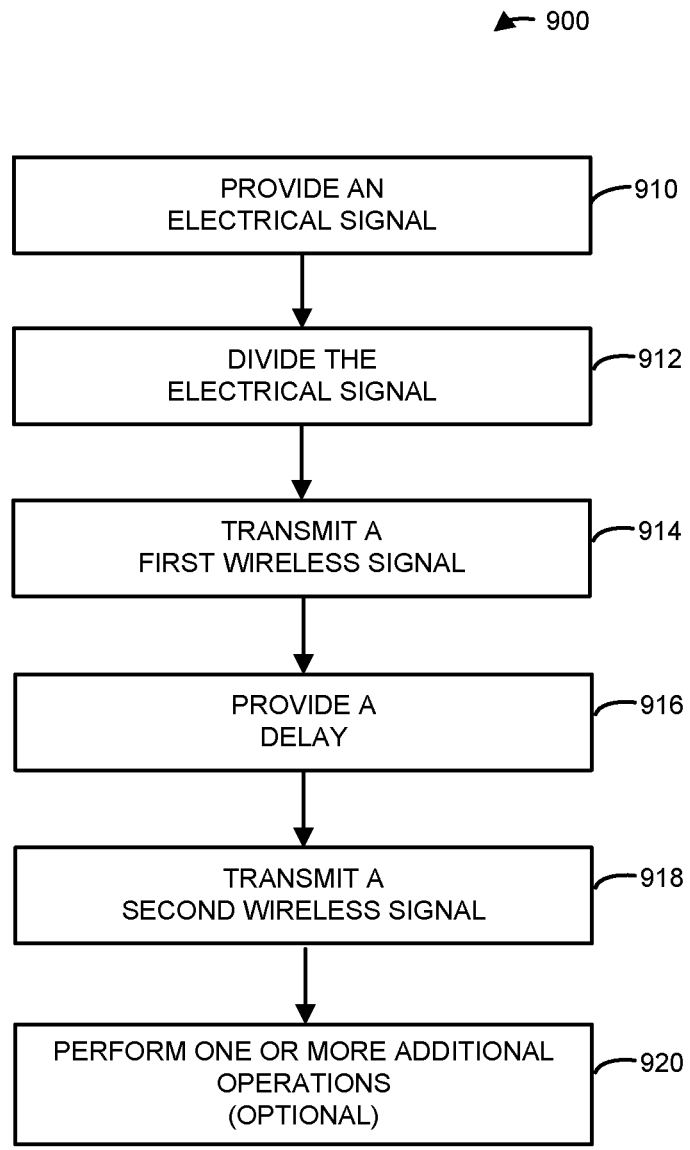
FIG. 9 is a flow diagram illustrating an example method for providing a first wireless signal and a second wireless signal using the electronic device of FIG. 1.

FIG. 9 presents a flow diagram illustrating an example method 900 for providing a first wireless signal and a second wireless signal. This method may be performed by an electronic device, such as electronic device 110 in FIG. 1. During operation, a radar transmitter in the electronic device may provide, to a transmission path in a transmission circuit in the electronic device, an electrical signal (operation 910). For example, the electrical signal may include a pulse. Then, after propagating in the transmission path, a power splitter in the transmission circuit may divide the electrical signal (operation 912) into a first output electrical signal in the first output transmission path and a second output electrical signal in the second output transmission path. Next, the first output electrical signal may propagate in the first output transmission path, and the first antenna may transmit the first wireless signal (operation 914) corresponding to the first output electrical signal. Furthermore, the second output electrical signal may propagate in the second output transmission path and the delay element that provides a delay (operation 916), and the second antenna may transmit the second wireless signal (operation 918) corresponding to the second output electrical signal.

Note that the second wireless signal may be delayed by the delay relative to the first wireless signal. Moreover, the first wireless signal may include a first pulse and the second wireless signal may include a second pulse.

In some embodiments, the electronic device performs one or more optional additional operations (operation 920). For example, the radar transmitter may repeat providing additional instances of the electrical signal to the transmission path in the transmission circuit. Notably, the additional instances of the electrical signal may be provided based at least in part on a time interval corresponding to a PRF. Additionally, the delay may correspond to one half of the PRF (or substantially one half of the PRF, e.g., within 1, 5 or 10% of one half of the PRF). This delay may ensure that the second wireless signal is temporally separate or offset from (and, thus, orthogonal to) the first wireless signal.

Moreover, during operation, N radar receivers in the electronic device may receive first wireless-return signals corresponding to the first wireless signal and second wireless-return signals corresponding to the second wireless signal. Then, the electronic device may combine the first wireless-return signals and the second wireless-return signals to create a virtual array MIMO radar having an antenna aperture size of 2N. Note that the electrical signal may have a fundamental wavelength and adjacent radar receivers of the N radar receivers may be separated by one half of the fundamental wavelength.

Figure 10:
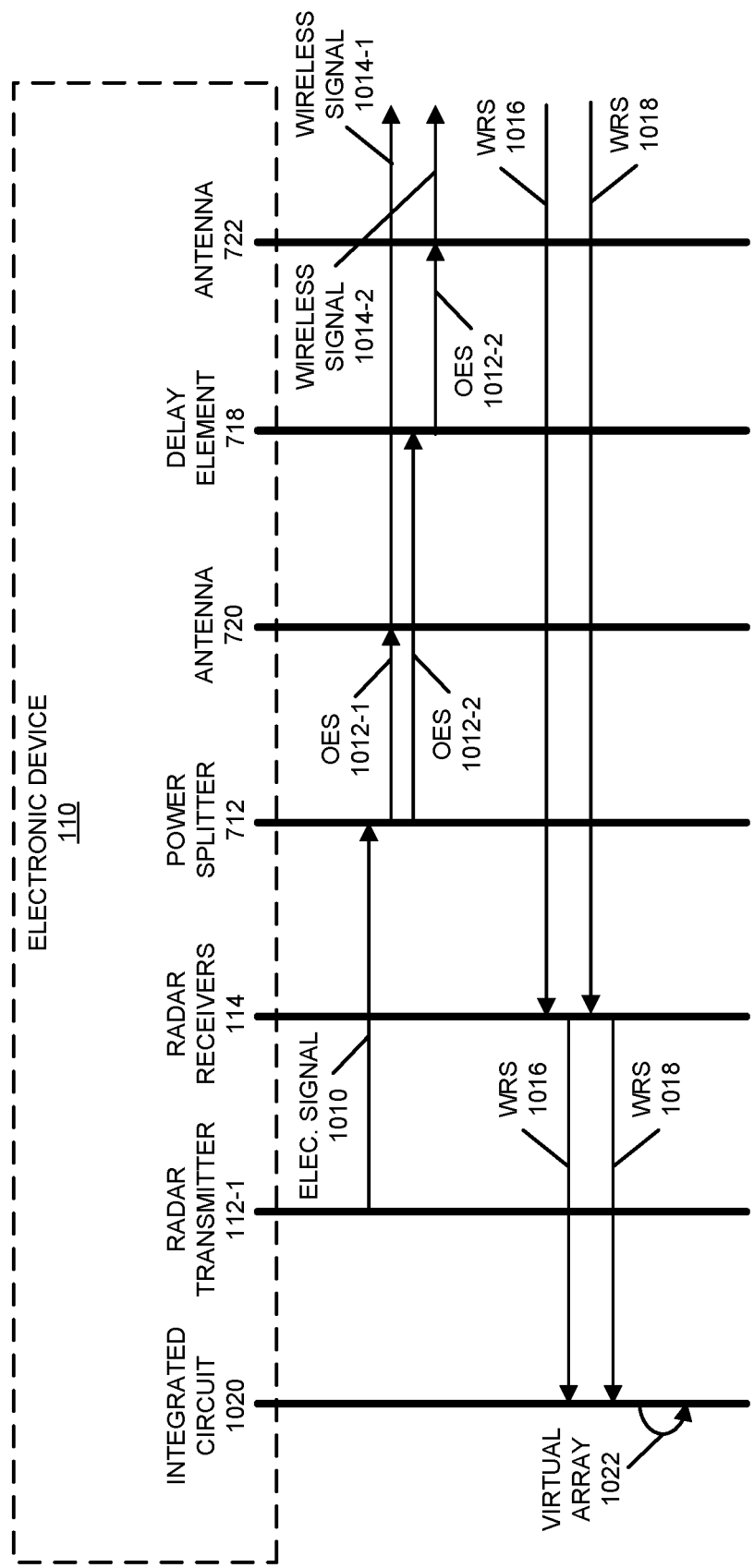
FIG. 10 is a flow diagram illustrating an example of communication among components in the electronic device of FIG. 1.

The measurement techniques are further illustrated in FIG. 10, which presents a flow diagram illustrating an example of communication among components in electronic device 110. During operation, radar transmitter 112-1 in electronic device 110 may provide electrical signal 1010. After dividing or splitting by power splitter 712 in transmission circuit 700, output electrical signal (OES) 1012-1 may be provided to antenna 720, which transmits wireless signal 1014-1. Moreover, output electrical signal 1012-2 may be delayed by delay element 718 and may be provided to antenna 722, which transmits wireless signal 1014-2. Note that wireless signals 1014 may include pulsed radar signals and/or continuous-wave radar signals.

Subsequently, N radar receivers 114 may receive wireless-return signals (WRS) 1016 corresponding to wireless signal 1014-1 and wireless-return signals 1018 corresponding to wireless signal 1014-2 via antennas (not shown). These wireless signals may be provided to integrated circuit 1020 (such as a processor), which combines them to create a virtual array 1022 having an aperture size of 2N.

Next, integrated circuit 1020 may perform one or more operations based at least in part on the electrical signals corresponding to virtual array 1022. For example, integrated circuit 1020 may determine a location (including a range and an angular position) of an object in an environment that includes electronic device 110 based at least in part on the radar measurements.

Moreover, integrated circuit 1020 may access one or more radar signatures stored in memory in electronic device 110, and may use the one or more radar signatures to identify an individual based at least in part on the radar measurements. For example, integrated circuit 1020 may compare the radar measurements and the one or more radar signatures to determine one or more match scores, and the identity may be determined based on one of the one or more match scores (such as a best or maximum match score).

Furthermore, integrated circuit 1020 may determine one or more additional parameters based at least in part on the radar measurements. For example, integrated circuit 1020 may determine a vital sign of the individual (such as a pulse, a blood pressure, or a respiration rate of the individual) and/or a medical condition of the individual (such as a medical emergency, a disease, a physical symptom, such as a tremor, a physical condition, e.g., dementia based at least in part on a gait of the individual, etc.). Alternatively or additionally, the one or more additional parameters may include: one or more dimensions of the environment. In some embodiments, the one or more additional parameters includes an acoustic property of the object in the environment or of the environment. For example, integrated circuit 1020 may access a look-up table, stored in the memory, with acoustic properties of different materials and/or objects as a function of radar measurements. Using this look-up table, integrated circuit 1020 may use the radar measurements to determine the acoustic property.

Figure 11:
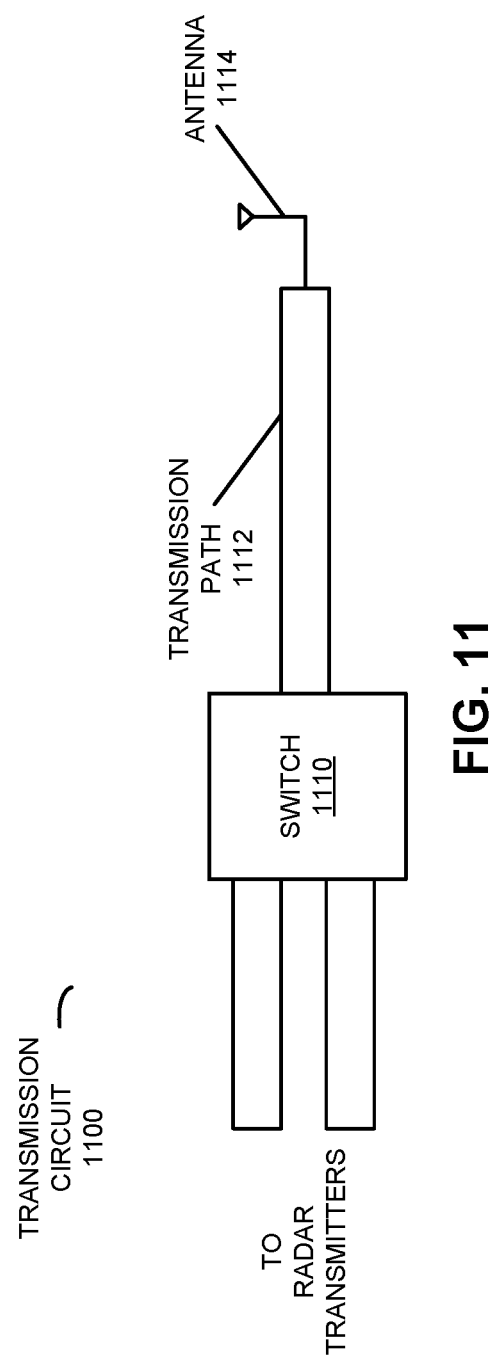
FIG. 11 is a block diagram illustrating an example of a transmission circuit in the electronic device of FIG. 1.

As noted previously, in some embodiments different radar transmitters are selectively coupled to a transmission path and an antenna by a switch in different time intervals. Moreover, the radar transmitters provide sets of electrical signals (such as pulses) that are transmitted as corresponding wireless signals in the different time intervals. This is shown in FIG. 11, which presents a block diagram illustrating an example of a transmission circuit 1100 in electronic device 110 (FIG. 1). Notably, in transmission circuit 1110, a switch 1110 may selectively communicatively couple (or decouple) transmitters (such as transmitters 112-1 and 112-2 in FIG. 1)

to a transmission path 1112 and an antenna 1114 (which may be a horizontal, a vertical or a circularly polarized antenna).

Figure 12:
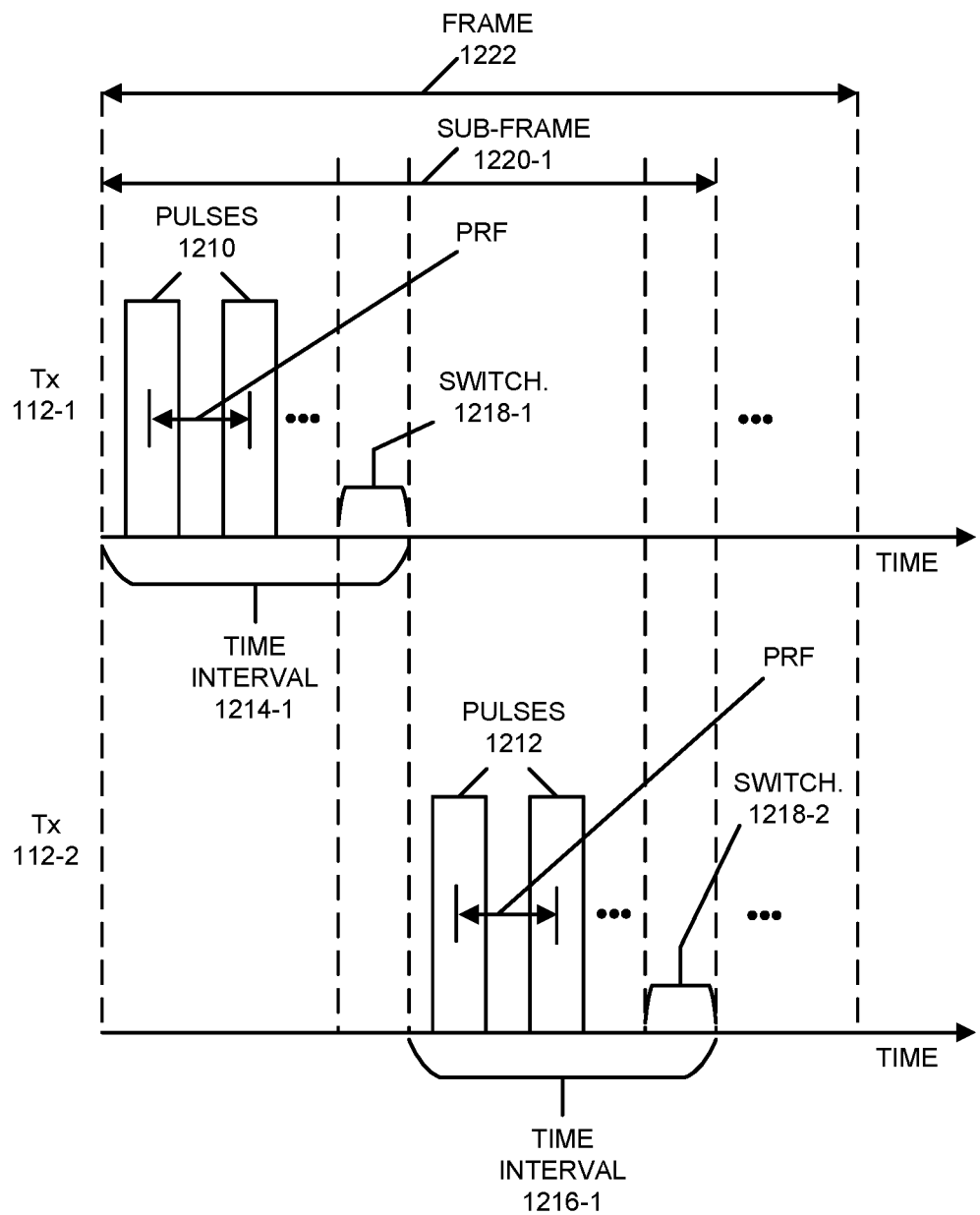
FIG. 12 is a drawing illustrating an example of operation of the transmission circuit of FIG. 11.

FIG. 12 presents a drawing illustrating operation of the transmission circuit 1100 (FIG. 11). During operation of an electronic device (such as electronic device 110) that includes transmission circuit 1100 in FIG. 11, radar transmitter 112-1 may provide a set of electrical signals (such as a pulses) having a carrier or a fundamental wavelength (e.g., 2.5 cm) to transmission path 1112 via switch 1110. Then, antenna 1114 may transmit wireless signals (such as pulses 1210, e.g., 150 pulses) corresponding to the set of electrical signals during time interval 1214-1. Note that pulses 1210 may have a temporal separation of PRF (e.g., 66.7 ns).

Next, switch 1110 may selectively communicatively couple radar transmitter 112-2 to transmission path 1112 and antenna 1114, and may decouple radar transmitter 112-1 from transmission path 1112 and antenna 1114 (which is indicated by switching 1218-1 in FIG. 12).

Then, radar transmitter 112-2 may provide a set of electrical signals (such as a pulses) having a carrier or a fundamental wavelength (e.g., 2.5 cm) to transmission path 1112 via switch 1110. Next, antenna 1114 may transmit wireless signals (such as pulses 1212, e.g., 150 pulses) corresponding to the set of electrical signals during time interval 1216-1. Note that pulses 1212 may have a temporal separation of PRF (e.g., 66.7 ns).

Moreover, switch 1110 may selectively communicatively couple radar transmitter 112-1 to transmission path 1112 and antenna 1114, and may decouple radar transmitter 112-2 from transmission path 1112 and antenna 1114 (which is indicated by switching 1218-2 in FIG. 12). Furthermore, time intervals 1214-1 and 1216-1 may define a sub-frame 1220-1. During subsequent instances of sub-frames, the transmitting of the first wireless signals and the second wireless signals is repeated in a frame 1222. For example, a sub-frame may have a duration of 100 μs, a frame may include 392 sub-frames or may have a frame rate of 255 Hz.

Furthermore, during time intervals 1214-1 and 1216-1, N radar receivers 114 (FIG. 1) (where N is a non-zero integer) may receive wireless-return signals, where adjacent radar receivers are separated by a distance of one half of the fundamental wavelength λ/2 (e.g., 1.25 cm). These wireless-return signals may be combined to create an antenna aperture size of 2N. For example, five physical channels (one radar transmitter 112-1 and four radar receivers 114) may be used to create an antenna aperture size of 8. While this approach is not passive, the frequency of the RF switching may be reduced, e.g., once per 5 μs. The reduced RF switching frequency may reduce the complexity and power consumption in embodiments of the measurement techniques, and use of multiple pulses 1210 and 1212 may increase the signal-to-noise ratio.

Figure 13:
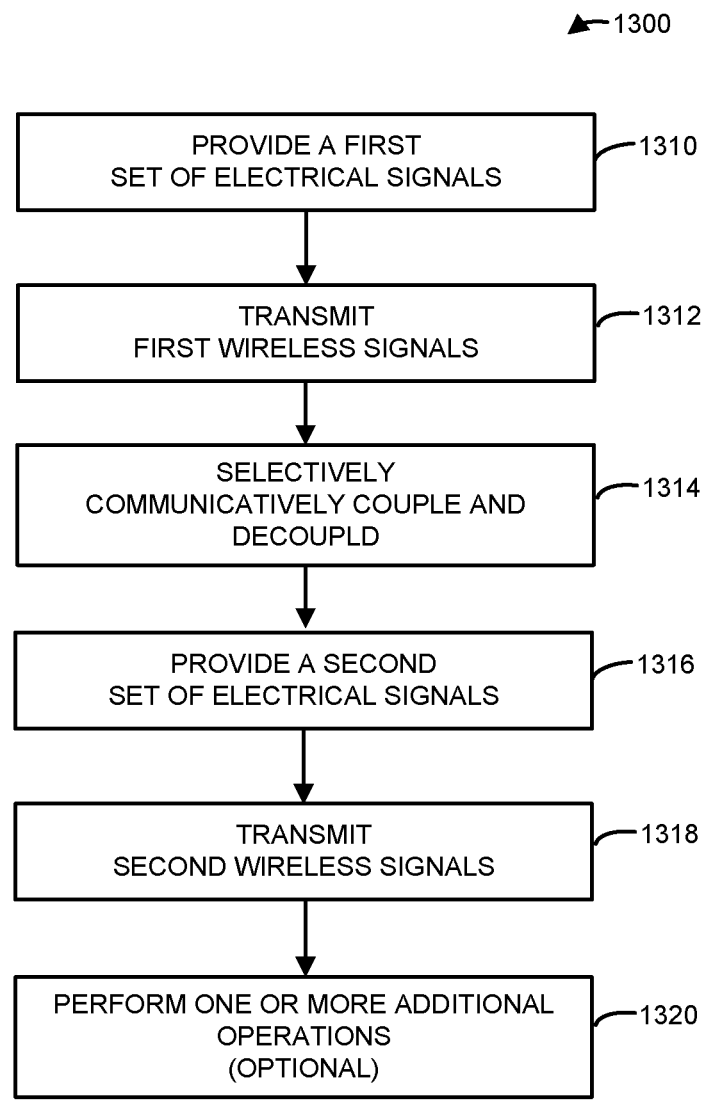
FIG. 13 is a flow diagram illustrating an example method for providing first wireless signals and second wireless signals using the electronic device of FIG. 1.

FIG. 13 presents a flow diagram illustrating an example method 1300 for providing first wireless signals and second wireless signals. This method may be performed by an electronic device, such as electronic device 110 in FIG. 1. During operation, a first radar transmitter in the electronic device may provide a first set of electrical signals (operation 1310) during a first time interval, where electrical signals in the first set of electrical signals may have a temporal separation corresponding to a PRF. After propagating through a switch and a transmission path in the electronic device, an antenna may transmit first wireless signals (operation 1312) corresponding to the first set of electrical signals during the first time interval. Then, the switch may selectively communicatively couple (operation 1314) a second radar transmitter in the electronic device to the transmission path, and may selectively decouple (operation 1314) the first radar transmitter from the transmission path. Next, the second radar transmitter may provide a second set of electrical signals (operation 1316) during a second time interval, where electrical signals in the second set of electrical signals may have the temporal separation corresponding to the PRF. After propagating through the switch and the transmission path, the antenna may transmit the second wireless signals (operation 1318) corresponding to the second set of electrical signals during the second time interval.

Note that the first set of electrical signals and the second set of electrical signals may include M pulses, where M is a non-zero integer.

In some embodiments, the electronic device performs one or more optional additional operations (operation 1320). For example, after transmitting the second wireless signals, the switch may selectively communicatively couple the first radar transmitter to the transmission path, and may selectively decouple the second radar transmitter from the transmission path.

Moreover, a sum of the first time interval and the second time interval may be a sub-frame, and the electronic device may repeatedly perform, in multiple sub-frames, the providing of the first set of electrical signals (operation 1310), the transmitting of the first wireless signals (operation 1312), the selective communicatively coupling and the decoupling (operations 1314 and 1316), the providing of the second set of electrical signals (operation 1318), the transmitting of the second wireless signals (operation 1320), and the selective communicatively coupling and the decoupling.

In some embodiments, the electronic device includes N radar receivers, where N is a non-zero integer. Furthermore, the first set of electrical signals and the second set of electrical signals may have a fundamental wavelength and adjacent radar receivers of the N radar receivers may be separated by one half of the fundamental wavelength (or substantially one half of the fundamental wavelength, e.g., 1, 5 or 10% of one half of the fundamental wavelength). During operation, the N radar receivers may receive first wireless-return signals corresponding to the first wireless signals and second wireless-return signals corresponding to the second wireless signals. Then, the electronic device may combine the first wireless-return signals and the second wireless-return signals to create a virtual array MIMO radar having an antenna aperture size of 2N.

Additionally, the first radar transmitter and the second radar transmitter may be spatially separated by an integer multiple of the fundamental wavelength (such as twice the fundamental wavelength).

In some embodiments of method 900 (FIG. 9) and/or method 1300, there may be additional or fewer operations. Further, one or more different operations may be included. Moreover, the order of the operations may be changed, and/or two or more operations may be combined into a single operation or performed at least partially in parallel. For example, the electrical signals provided by the radar transmitter(s) may be encoded, such as by using phase and/or amplitude encoding (e.g., using pulse code modulation).

Figure 14:
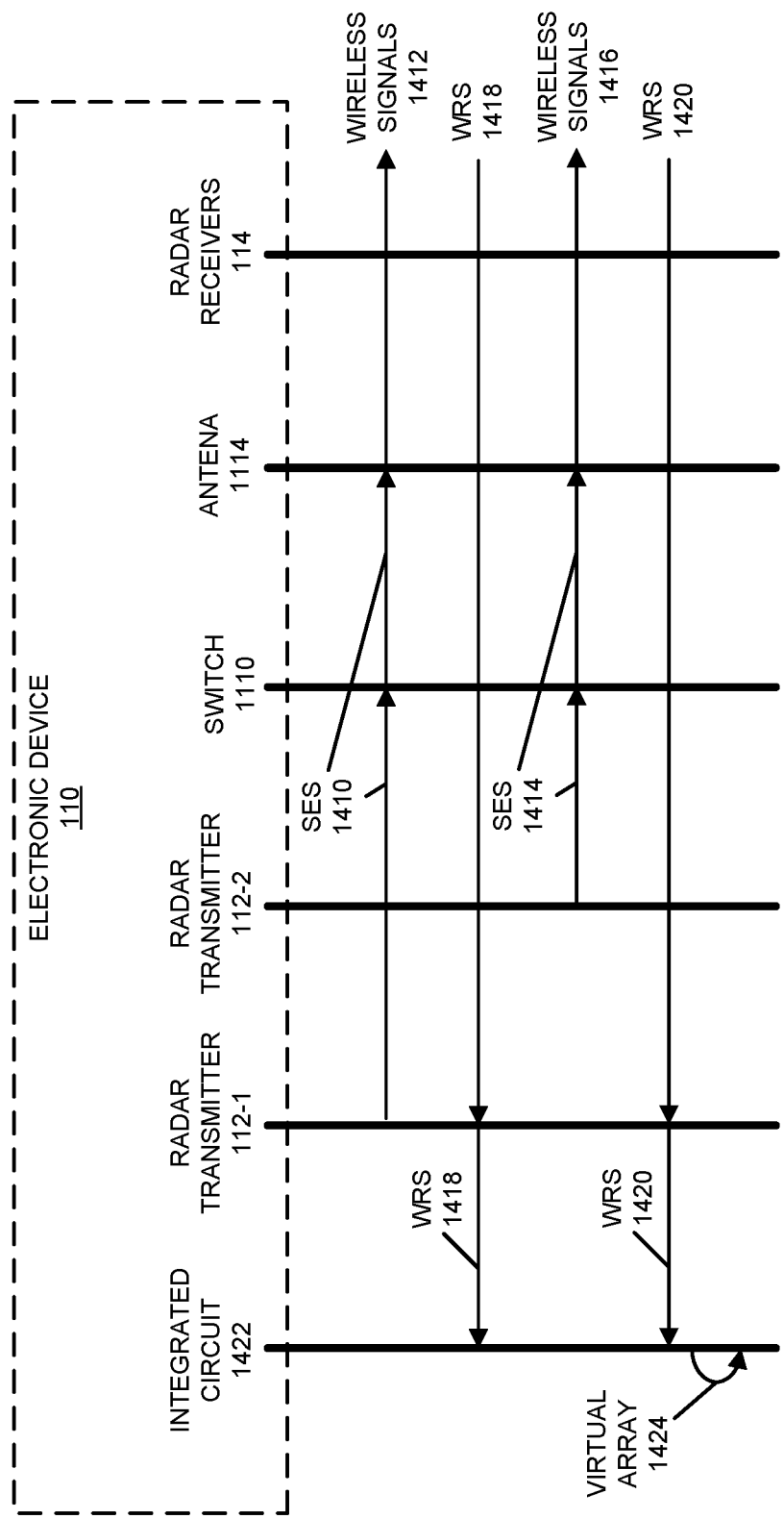
FIG. 14 is a flow diagram illustrating an example of communication among components in the electronic device of FIG. 1.

The measurement techniques are further illustrated in FIG. 14, which presents a flow diagram illustrating an example of communication among components in electronic device 110. During operation, radar transmitter 112-1 in electronic device 110 may provide a set of electrical signals (SES) 1410. The set of electrical signals 1410 is provided by switch 1110 to antenna 1114, which transmits wireless signals 1412-1.

Then, switch 1110 switches 1414, so that radar transmitter 112-2 in electronic device 110 is communicatively coupled to antenna 1114, and radar transmitter 112-1 is decoupled from antenna 1114. Next, radar transmitter 112-2 may provide a set of electrical signals 1416. The set of electrical signals 1416 is provided by switch 1110 to antenna 1114, which transmits wireless signals 1412-2.

Moreover, N radar receivers 114 may receive wireless-return signals 1418 corresponding to wireless signals 1412-1 and wireless-return signals 1420 corresponding to wireless signals 1412-2 via antennas (not shown). These wireless signals may be provided to integrated circuit 1422 (such as a processor), which combines them to create a virtual array 1424 having an aperture size of 2N. Integrated circuit 1422 may perform one or more operations based at least in part on the radar measurements, as described previously with reference to FIG. 10.

While communication between the components in FIGS. 10 and 14 is illustrated with unilateral or bilateral communication (e.g., lines having a single arrow or dual arrows), in general a given communication operation may be unilateral or bilateral.

Moreover, while the preceding discussion illustrated embodiments of the measurement techniques in FIGS. 10-14 with two radar transmitters and N radar receivers, in general there may be M radar transmitters and N radar receivers, where M is a non-zero integer than is less than, greater than or equal to N. Moreover, in these embodiments, there may be up to M antennas, such that at least some of the antennas may be shared by different radar transmitters.

In summary, the measurement techniques may allow accurate, low-cost determination of the location of an object in an environment, such as an individual. Moreover, the measurement techniques may be used to identify the individual, a vital sign(s) and/or a medical condition(s) of the individual, and/or one or more parameters or properties of the object or the environment. The non-invasive radar measurements may simplify the use of the electronic device and may facilitate additional services and applications. Consequently, the measurement techniques may improve the user experience when using the electronic device.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include physical characteristics, demographic data, location-based data, telephone numbers, email addresses, Twitter ID's, home addresses (e.g., from commands), data or records relating to a user's health or level of fitness (e.g., vital signs measurements, medication information, exercise information, etc.), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. Notably, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Moreover, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Furthermore, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively limit or block the use of, or access to, personal information data. That is, the present disclosure contemplates that hardware and/or software elements can be provided to limit, prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 15 presents a block diagram of an electronic device 1500 (which may be a cellular telephone, a smartwatch, an access point, a wireless speaker, an IoT device, another electronic device, etc.) in accordance with some embodiments. This electronic device includes processing subsystem 1510, memory subsystem 1512, networking subsystem 1514 and measurement subsystem 1532. Processing subsystem 1510 includes one or more devices configured to perform computational operations. For example, processing subsystem 1510 can include one or more microprocessors, application-specific integrated circuits (ASICs), microcontrollers, graphics processing units (GPUs), programmable-logic devices, and/or one or more digital signal processors (DSPs).

Memory subsystem 1512 includes one or more devices for storing data and/or instructions for processing subsystem 1510, networking subsystem 1514 and/or measurement subsystem 1532. For example, memory subsystem 1512 can include dynamic random access memory (DRAM), static random access memory (SRAM), a read-only memory (ROM), flash memory, and/or other types of memory. In some embodiments, instructions for processing subsystem 1510 in memory subsystem 1512 include: program instructions or sets of instructions (such as program instructions 1522 or operating system 1524), which may be executed by processing subsystem 1510. For example, a ROM can store programs, utilities or processes to be executed in a non-volatile manner, and DRAM can provide volatile data storage, and may store instructions related to the operation of electronic device 1500. Note that the one or more computer programs may constitute a computer-program mechanism, a computer-readable storage medium or software. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510. In some embodiments, the one or more computer programs are distributed over a network-coupled computer system so that the one or more computer programs are stored and executed in a distributed manner.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), such as: control logic, an interface circuit and a set of antennas (or antenna elements) in an adaptive array that can be selectively turned on and/or off by control logic to create a variety of optional antenna patterns or 'beam patterns.' Alternatively, instead of the set of antennas, in some embodiments electronic device 1500 includes one or more nodes, e.g., a pad, which can be coupled to the set of antennas. Thus, electronic device 1500 may or may not include the set of antennas. For example, networking subsystem 1514 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or frame frames and/or scanning for advertising frames transmitted by other electronic devices.

Measurement subsystem 1532 includes one or more devices configured to transmit radar signals and to perform radar measurements, such as: control logic 1516, multiple radar transmitters 1518 and radar receivers 1534 that are collocated in electronic device 1500, and a set of antennas 1520 (or antenna elements) that are electrically coupled to radar transmitters 1518 and radar receivers 1534 at nodes 1508 (such as, e.g., one or more pads). These radar receivers may be synchronized with each other using one or more clock signals provided by clock 1536. In some embodiments, set of antennas 1520 have a directional antenna pattern that is other than or different from an omnidirectional antenna pattern.

Within electronic device 1500, processing subsystem 1510, memory subsystem 1512, networking subsystem 1514 and measurement subsystem 1532 are coupled together using bus 1528 that facilitates data transfer between these components. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the subsystems.

In some embodiments, electronic device 1500 includes a display subsystem 1526 for displaying information on a display, which may include a display driver and the display, such as a liquid-crystal display, a multi-touch touchscreen, etc. Display subsystem 1526 may be controlled by processing subsystem 1510 to display information to a user (e.g., information relating to incoming, outgoing, or an active communication session).

Electronic device 1500 can also include a user-input subsystem 1530 that allows a user of the electronic device 1500 to interact with electronic device 1500. For example, user-input subsystem 1530 can take a variety of forms, such as: a button, keypad, dial, touch screen, audio input interface, visual/image capture input interface, input in the form of sensor data, etc.

Electronic device 1500 can be (or can be included in) any electronic device with at least one network interface or a measurement subsystem. For example, electronic device 1500 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments some or all of a given subsystem or component can be integrated into one or more of the other subsystems or component(s) in electronic device 1500. For example, in some embodiments program instructions 1522 are included in operating system 1524 and/or control logic 1516 is included in radar transmitters 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1514. This integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Alternatively or additionally, an integrated circuit (which is sometimes referred to as a 'measurement circuit') may implement some or all of the functionality of measurement subsystem 1532. This integrated circuit may include hardware and/or software mechanisms that are used for transmitting radar signals from electronic device 1500 and receiving radar signals at electronic device 1500.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the measurement techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement techniques may be implemented using program instructions 1522, operating system 1524 (such as a driver for an interface circuit in networking subsystem 1514 or for radar transmitters 1518 or radar receivers 1534 in measurement subsystem 1532) or in firmware in an interface circuit networking subsystem 1514 or in measurement subsystem 1532. Alternatively or additionally, at least some of the operations in the measurement techniques may be implemented in a physical layer, such as hardware in an interface circuit in networking subsystem 1514 or in measurement subsystem 1532. In some embodiments, the measurement techniques are implemented, at least in part, in a MAC layer and/or in a physical layer in an interface circuit in networking subsystem 1514.

While examples of numerical values are provided in the preceding discussion, in other embodiments different numerical values are used. Consequently, the numerical values provided are not intended to be limiting.

Moreover, while the preceding embodiments illustrated the use of radar signals, in other embodiments of the measurement techniques electromagnetic signals in one or more different frequency bands are used to determine the location of the object. For example, these signals may be communicated in one or more bands of frequencies, including: 900 MHz, 2.4 GHz, 5 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a radar transmitter; and
a transmission circuit communicatively coupled to the radar transmitter, wherein the transmission circuit comprises a transmission path that is divided by a power splitter into a first output transmission path and a second output transmission path, wherein the second output transmission path comprises a delay element configured to provide a delay period, wherein the first output transmission path is communicatively coupled to a first antenna, and the second output transmission path is communicatively coupled to a second antenna, and wherein the electronic device is configured to:
provide, from the radar transmitter, an electrical signal to the transmission path in the transmission circuit;
divide, using the power splitter, the electrical signal into a first output electrical signal in the first output transmission path and a second output electrical signal in the second output transmission path;
transmit, from the first antenna, a first wireless signal corresponding to the first output electrical signal; and
transmit, from the second antenna, a second wireless signal corresponding to the second output electrical signal, wherein the electrical signal has a fundamental wavelength, and
wherein the first antenna and the second antenna are separated by an integer multiple of the fundamental wavelength.

2. The electronic device of claim 1, wherein the electrical signal comprises a pulse.

3. The electronic device of claim 1, wherein the second wireless signal is delayed by the delay period relative to the first wireless signal.

4. The electronic device of claim 1, wherein the first wireless signal comprises a first pulse and the second wireless signal comprises a second pulse.

5. The electronic device of claim 1, wherein the electronic device is configured to provide, from the radar transmitter, one or more additional instances of the electrical signal to the transmission path in the transmission circuit.

6. The electronic device of claim 5, wherein the one or more additional instances of the electrical signal are provided based at least in part on a time interval corresponding to a pulse repetition frequency (PRF).

7. The electronic device of claim 6, wherein the delay period corresponds to substantially one half of the PRF.

8. The electronic device of claim 1, wherein the electronic device comprises N radar receivers and N is a non-zero integer;
wherein first and second adjacent radar receivers of the N radar receivers are separated by substantially one half of the fundamental wavelength; and wherein the electronic device is configured to:
receive, at the N radar receivers, one or more first wireless-return signals corresponding to the first wireless signal and one or more second wireless-return signals corresponding to the second wireless signal; and
combine the one or more first wireless-return signals and the one or more second wireless-return signals to create a virtual array multi-input multi-output (MIMO) radar having an antenna aperture size of N.

9. A non-transitory computer-readable storage medium for use in conjunction with an electronic device, the computer-readable storage medium storing program instructions that, when executed by the electronic device, cause the electronic device to provide a first wireless signal and a second wireless signal by carrying out operations comprising:
providing, from a radar transmitter in the electronic device, an electrical signal to a transmission path in a transmission circuit, wherein the transmission path is divided by a power splitter into a first output transmission path and a second output transmission path;
dividing, using the power splitter, the electrical signal into a first output electrical signal in the first output transmission path and a second output electrical signal in the second output transmission path;
delaying, using a delay element in the second output transmission path, the second output electrical signal by a delay period;
transmitting, from a first antenna, the first wireless signal corresponding to the first output electrical signal; and
transmitting, from a second antenna, the second wireless signal corresponding to the second output electrical signal, wherein the electrical signal has a fundamental wavelength, and
wherein the first antenna and the second antenna are separated by an integer multiple of the fundamental wavelength.

10. The non-transitory computer-readable storage medium of claim 9, wherein the electrical signal comprises a pulse.

11. The non-transitory computer-readable storage medium of claim 9, wherein the first wireless signal comprises a first pulse and the second wireless signal comprises a second pulse.

12. The non-transitory computer-readable storage medium of claim 9, wherein the operations comprise providing, from the radar transmitter, one or more additional instances of the electrical signal to the transmission path.

13. The non-transitory computer-readable storage medium of claim 12, wherein the one or more additional instances of the electrical signal are provided based at least in part on a time interval corresponding to a pulse repetition frequency (PRF).

14. The non-transitory computer-readable storage medium of claim 13, wherein the delay period corresponds to substantially one half of the PRF.

15. The non-transitory computer-readable storage medium of claim 9, wherein the operations comprise:
receiving, at N radar receivers in the electronic device, one or more first wireless-return signals corresponding to the first wireless signal and one or more second wireless-return signals corresponding to the second wireless signal, wherein N is a non-zero integer, and wherein the at least two adjacent radar receivers of the N radar receivers are separated by substantially one half of the fundamental wavelength; and combining the one or more first wireless-return signals and the one or more second wireless-return signals to create a virtual array multi-input multi-output (MIMO) radar having an antenna aperture size of 2N.

16. A method for providing a first wireless signal and a second wireless signal, comprising:

by an electronic device:

providing, from a radar transmitter in the electronic device, an electrical signal to a transmission path in a transmission circuit, wherein the transmission path is divided by a power splitter into a first output transmission path and a second output transmission path;

dividing, using the power splitter, the electrical signal into a first output electrical signal in the first output transmission path and a second output electrical signal in the second output transmission path;

delaying, using a delay element in the second output transmission path, the second output electrical signal by a delay period;

transmitting, from a first antenna, the first wireless signal corresponding to the first output electrical signal; and transmitting, from the second antenna, the second wireless signal corresponding to the second output electrical signal, wherein the electrical signal has a fundamental wavelength, and wherein the first antenna and the second antenna are separated by an integer multiple of the fundamental wavelength.

17. The method of claim 16, the first wireless signal comprises a first pulse and the second wireless signal comprises a second pulse.

18. The method of claim 16, wherein the method comprises providing, from the radar transmitter, one or more additional instances of the electrical signal to the transmission path, the one or more additional instances of the electrical signal being provided based at least in part on a time interval corresponding to a pulse repetition frequency (PRF).

19. The method of claim 18, wherein the delay period corresponds to substantially one half of the PRF.

20. The method of claim 16, wherein the method comprises:

receiving, at N radar receivers in the electronic device, one or more first wireless-return signals corresponding to the first wireless signal and one or more second wireless-return signals corresponding to the second wireless signal, wherein N is a non-zero integer, and wherein at least two adjacent radar receivers of the N radar receivers are separated by one half of the fundamental wavelength;

combining the one or more first wireless-return signals and the one or more second wireless-return signals to create a virtual array multi-input multi-output (MIMO) radar having an antenna aperture size of 2N.

* * * * *

UNITED STATES PATENT AND TRADEMARK OFFICE
CERTIFICATE OF CORRECTION

PATENT NO. : 11,435,467 B2
APPLICATION NO. : 16/583564
DATED : September 6, 2022
INVENTOR(S) : Jouya Jadidian et al.

It is certified that error appears in the above-identified patent and that said Letters Patent is hereby corrected as shown below:

In the Claims

Column 24, Line 65, delete "wherein the" and insert --wherein--.

Signed and Sealed this
Twentieth Day of June, 2023

Katherine Kelly Vidal
*Director of the United States Patent and Trademark Office*